(12) United States Patent
Lee et al.

(10) Patent No.: US 7,922,343 B2
(45) Date of Patent: Apr. 12, 2011

(54) LENS-SHIFTING DEVICE

(75) Inventors: Sea-Huang Lee, Hsinchu (TW);
Wen-Ching Ho, Hsinchu (TW);
Fu-Shun Kao, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 628 days.

(21) Appl. No.: 11/952,147

(22) Filed: Dec. 7, 2007

(65) Prior Publication Data

US 2009/0002645 A1    Jan. 1, 2009

(30) Foreign Application Priority Data

Jun. 29, 2007    (TW) .............................. 96123773 A

(51) Int. Cl.
*G03B 21/14*    (2006.01)
*G02B 15/14*    (2006.01)
*G02B 7/02*    (2006.01)
(52) U.S. Cl. ......... 353/101; 359/819; 359/813; 359/694
(58) Field of Classification Search .................. 353/100, 353/101; 359/554, 557, 694, 696, 699, 813, 359/819, 822; 348/208.4, 208.7, 208.11; 396/52–55
See application file for complete search history.

(56) References Cited

U.S. PATENT DOCUMENTS 6,909,560 B2    6/2005   Lin et al.
6,966,657 B2    11/2005  Van De Velde et al.

FOREIGN PATENT DOCUMENTS

JP    57-124318   8/1982
TW    M245456    10/2004
TW    I248548    2/2006

OTHER PUBLICATIONS

"Notice of Allowance of Taiwan Counterpart Application," issued on Sep. 29, 2010, p. 1-p. 4, in which the listed references were cited.

*Primary Examiner* — Georgia Y Epps
*Assistant Examiner* — Danell L Owens
(74) *Attorney, Agent, or Firm* — Jianq Chyun IP Office

(57) ABSTRACT

A lens-shifting device including a base, two fixing rods, a sliding plate, a first and a second gear set is provided. The sliding plate is slidably mounted on the fixing rods via the fixing rods. A lens is fixed on the sliding plate and the sliding plate has a rack disposed on one side thereof. The first gear set has a first gear and a worm gear co-axial therewith. One of the fixing rods passes through the first gear such that the first gear and the worm gear may rotate relative to the fixing rod. The second gear set having a worm wheel and a second gear co-axial therewith is disposed between the fixing rod and the rack. The worm gear is for driving the worm wheel and the second gear is used for driving the rack such that the sliding plate moves relative to the fixing rods.

20 Claims, 6 Drawing Sheets

LENS-SHIFTING DEVICE

CROSS-REFERENCE TO RELATED APPLICATION

This application claims the priority benefit of Taiwan application serial no. 96123773, filed on Jun. 29, 2007. The entirety of the above-mentioned patent application is hereby incorporated by reference herein and made a part of this specification.

BACKGROUND OF THE INVENTION

1. Field of the Invention

The present invention generally relates to a lens-shifting device, and more particularly, to a projection lens-shifting device having a high positioning resolution and a self-locking function.

2. Description of Related Art

At present, the lens of most projectors are fixed. Therefore, the user shifts the position of image projected on the screen only by adjusting the relative position and angle between the projector and the screen. Therefore, to project a suitable image on the screen, the user must spend a lot of time and effort to position the projector such that the projector is moved to a suitable location or adjusted to a suitable angle relative to the screen.

After fixing the location of the projector, if the image projected on the screen needs to be raised a little higher, the user is required to adjust the height adjusting device disposed on the front leg of the projector so as to modify the tilt angle of the projecting direction. However, because the angle between the projection lens and the screen has been changed, the image projected on the screen is distorted and changes, for example, from a rectangular shape to a trapezoidal shape.

To resolve the foregoing problem, a lens-shifting mechanism for a projector has been developed to facilitate the adjustment of the lens when the projector is in a static state and achieve the purpose of adjusting the image projected on the screen.

FIG. 1 is a perspective view showing a conventional mechanism for shifting a projection lens. As shown in FIG. 1, the projection lens-shifting mechanism 1 mainly includes a driving wheel 11, a worm gear 12, two fixing rods 13, 14 and a movable plate 16. Furthermore, one side of the movable plate has a rack 161. The projection lens 18 is disposed on the movable plate 16. The movable plate 16 is movably mounted on the fixing rods 13 and 14. The worm gear 12 is disposed at one end of the driving wheel 11, and the driving wheel 11 and the worm gear 12 are co-axial. Moreover, the fixing rod 13 passes through the driving wheel 11 and the worm gear 12, and the driving wheel 11 and the worm gear 12 are capable of rotating relative to the fixing rod 13. When the driving wheel 11 is driven to rotate, the worm gear 12 also rotates. The rotation of the worm gear 12 drives the rack 161 engaged therewith so that the movable plate 16 moves relative to the fixing rods 13 and 14 in the directions as indicated by the double arrow in the figure. Hence, the purpose of shifting the position of the projection lens 18 is achieved.

However, the worm gear 12 and the rack 161 may not be tightly engaged due to gaps created in the design or produced by the assembling process. Therefore, when the projector is being transported from one place to another, the movable plate 16 may slide instead of being self-locked so that the worm gear 12 and the rack 161 may not be perfectly engaged. Consequently, high resolution positioning is not provided.

SUMMARY OF THE INVENTION

Accordingly, the present invention provides a lens-shifting device. The lens-shifting device has a gear set disposed between a worm gear on a fixing rod and a rack on a sliding plate. Through a tight mesh between the gear set and the worm gear and between the gear set and the rack, high resolution positioning is achieved.

According to an embodiment of the present invention, a lens-shifting device for adjusting the lens of a projector on any position along a single axis is provided. The lens-shifting device includes a base, a first fixing rod, a second fixing rod, a sliding plate, a first gear set and a second gear set. The first fixing rod and the second fixing rod are disposed on two sides of the base, respectively. The sliding plate is slidably mounted on the first fixing rod and the second fixing rod. A lens is fixed on the sliding plate and the sliding plate has a rack disposed on one side thereof. The first gear set has a first gear and a worm gear co-axial with the first gear. The first fixing rod passes through the first gear such that the first gear and the worm gear are able to rotate relative to the first fixing rod. The second gear set having a worm wheel and a second gear co-axial with the worm wheel is disposed between the first fixing rod and the rack. The worm gear is used for driving the worm wheel and the second gear is used for driving the rack such that the sliding plate is able to move relative to the first fixing rod and the second fixing rod.

The present invention also provides a lens-shifting device for adjusting the position of the lens anywhere on a two-dimensional plane. The lens-shifting device includes a first axial direction adjusting mechanism and a second axial direction adjusting mechanism. The first axial direction adjusting mechanism is disposed on the base and includes a first fixing rod, a second fixing rod, a first sliding plate, a first gear set and a second gear set. The first fixing rod and the second fixing rod are respectively fixed on two sides of the base. The first sliding plate is slidably mounted on the first fixing rod and the second fixing rod, wherein a first rack is disposed on a first side of the first sliding plate. The first gear set has a first gear wheel and a first worm gear co-axial with the first gear wheel. The first fixing rod passes through the first gear set such that the first gear and the worm gear may rotate relative to the first fixing rod. The second gear set having a first worm wheel and a second gear co-axial with the first worm wheel is disposed between the first fixing rod and the first rack. The first worm gear is used for driving the first worm wheel and the second gear is used for driving the first rack such that the first sliding plate moves in the first axial direction relative to the first fixing rod and the second fixing rod. The second axial direction adjusting mechanism is disposed on the first sliding plate and includes a third fixing rod, a fourth fixing rod, a second sliding plate, a third gear set and a fourth gear set. The third fixing rod and the fourth fixing rod are respectively fixed on a third side and fourth side of the first sliding plate. The second sliding plate is slidably mounted on the third fixing rod and the fourth fixing rod along the second axial direction. The lens is fixed on the second sliding plate, and a second rack is disposed on one side of the second sliding plate. The second axial direction is substantially perpendicular to the first axial direction. The third gear set has a third gear and a second worm gear co-axial with the third gear. The third fixing rod passes through the third gear such that the third gear and the second worm gear may rotate relative to the third fixing rod. The fourth gear set having a second worm wheel and a fourth gear co-axial with the second worm wheel is disposed between the third fixing rod and the second rack. The second worm gear is used for driving the second worm wheel and the fourth gear is used for driving the second rack such that the second sliding plate moves in the second axial direction relative to the third fixing rod and the fourth fixing rod.

The lens-shifting device has a gear set disposed between the worm gear slid on the fixing rod and the rack on the sliding plate. Through the tight mesh between the gear set and the worm gear and between the gear set and the rack, the lens is accurately positioned. Corresponding gear sets may be disposed on the left and right side as well as the top and bottom side of sliding plate. Through the coordination of the gear sets with the racks on the sliding plate, the sliding plate moves along the X-axis or Y-axis smoothly and steadily without tilting. In addition, a self-locking mechanism is disposed on the gear set so that the sliding plate may has a self-locking action to prevent the lens from swinging or shifting when the projector is being carried from one place to another.

In order to make the aforementioned and other objects, features and advantages of the present invention comprehensible, preferred embodiments accompanied with figures are described in detail below.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
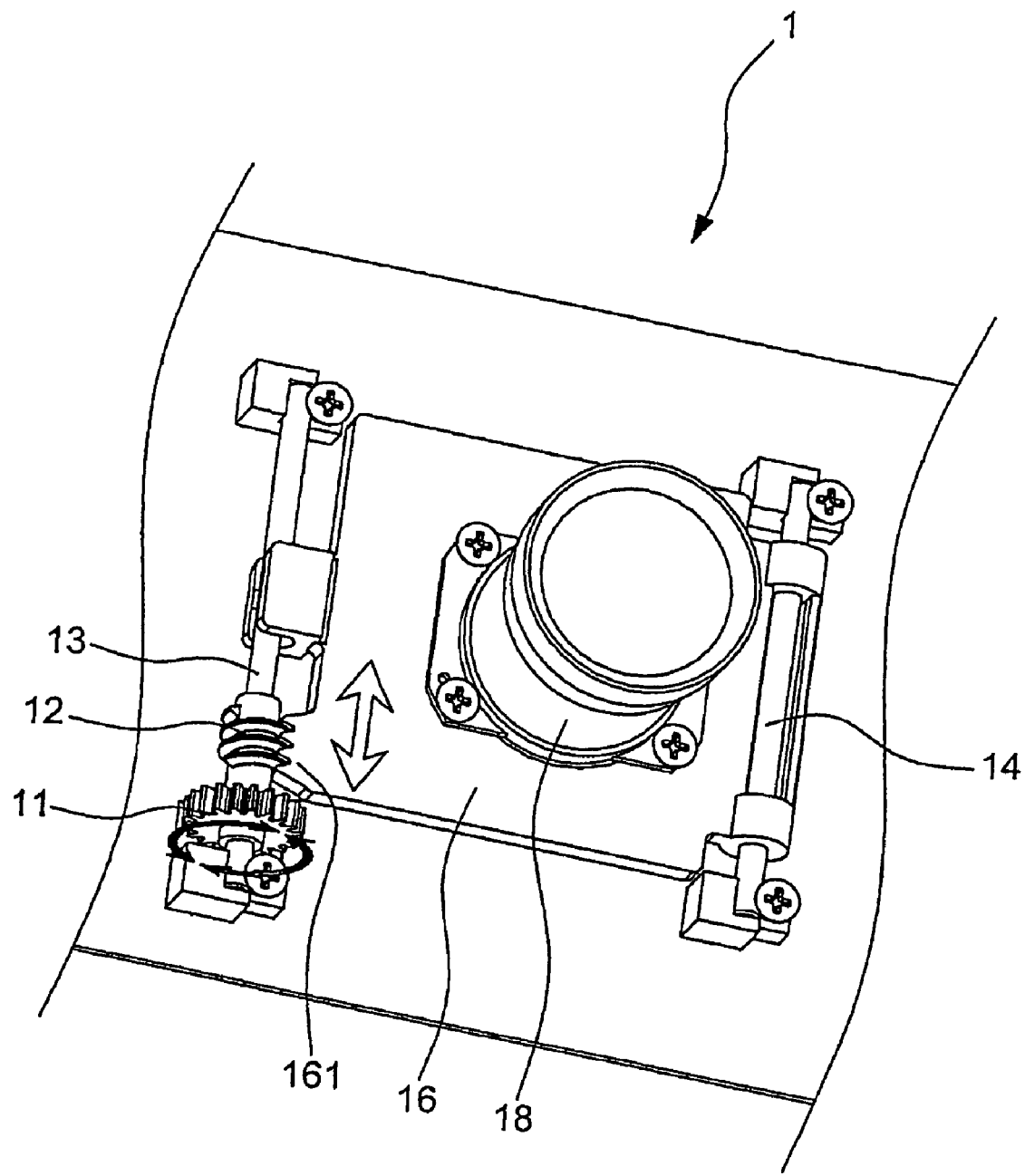
FIG. 1 is a perspective view showing a conventional mechanism for shifting a projection lens.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
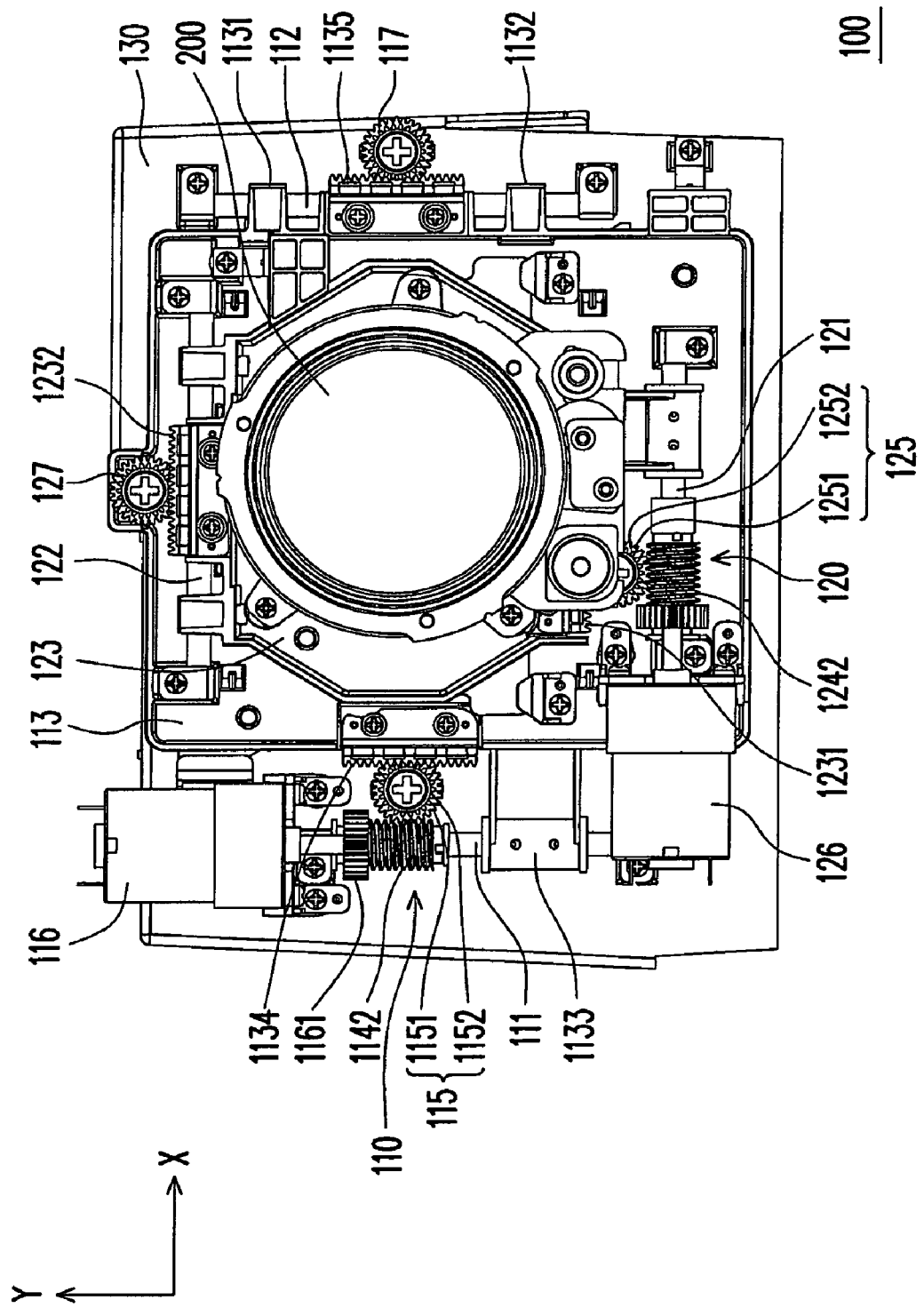
FIGS. 2A and 2B are diagrams showing respectively a top view and a perspective view of a lens-shifting device according to an embodiment of the present invention.
Figure 2B:
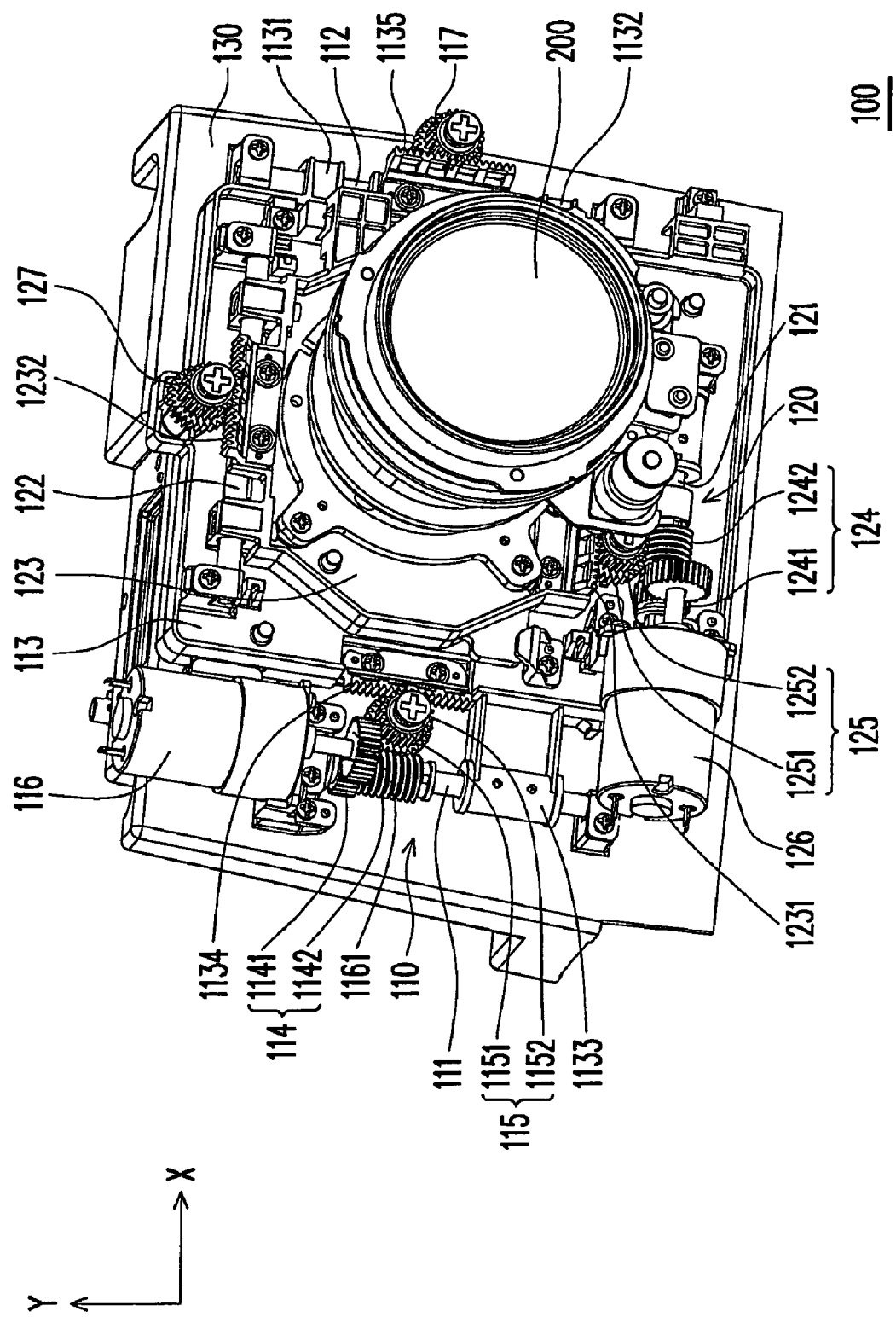

FIGS. 2A and 2B are diagrams showing respectively a top view and a perspective view of a lens-shifting device according to an embodiment of the present invention. As shown in FIGS. 2A and 2B, the lens-shifting device 100 according to the embodiment of the present invention is applied in a projector (not shown). The lens-shifting device 100 includes a first axial direction adjusting mechanism 110 and a second axial direction adjusting mechanism 120 that allow a user to adjust the position of a lens 200 in the second axial direction (X-axis) and the first axial direction (Y-axis). In the following, the components of the first axial direction adjusting mechanism 110 and the connecting relationships between the components are described with reference to the diagrams.

The first axial direction adjusting mechanism 110 is disposed on a base 130 and includes a first fixing rod 111, a second fixing rod 112, a first sliding plate 113, a first gear set 114 and a second gear set 115. The first fixing rods 111 and the second fixing rod 112 are parallel, and are fixed on two sides of the base 130, and furthermore, are disposed on a first side and a second side of the first sliding plate 113, respectively. The first sliding plate 113 is slidably mounted on the first fixing rod 111 and the second fixing rod 112 along the Y-axis. In the present embodiment, two sleeves 1131 and 1132 are disposed on the second side of the first sliding plate 113. Moreover, the first side of the first sliding plate 113 is connected to a transmission axis ring 1133. Through the sleeves 1131 and 1132 and the transmission axis ring 1133, the first sliding plate 113 is disposed on the first fixing rod 111 and the second fixing rod 112 and is movable along the Y-axis relative to the first fixing rod 111 and the second fixing rod 112.

More specifically, the sleeves 1131, 1132 and the transmission axis ring 1133 are fabricated using POM material. Because of the surface smoothness of the POM material, resistance to the motion of the first sliding plate 113 on the first fixing rod 111 and the second fixing rod 112 are minimized so that the lens 200 moves smoothly. A through hole (not shown) is also set up on the first sliding plate 113 so that the bottom of the lens 200 is disposed in this through hole. In addition, the first side of the first sliding plate 113 has a first rack 1134. In the present embodiment, the first rack 1134 is fixed to the first sliding plate 113 by locking. However, the first rack 1134 may be fixed to the first sliding plate 113 by other means and the present invention is not intended to set up any limitation.

The first gear set 114 has a first gear 1141 and a first worm gear 1142 co-axial with the first gear 1141. The first fixing rod 111 passes through the first gear set 114 such that the first gear 1141 and the first worm gear 1142 is rotatable relative to the first fixing rod 111. In the present embodiment, the lens-shifting device 100 further includes a first motor set 116. Through the rotation of a gear 1161 of the first motor set 116, the first gear 1141 is driven to rotate.

The second gear set 115 is disposed between the first fixing rod 111 and the first rack 1134. The second gear set 115 has a first worm wheel 1151 and a second gear 1152 co-axial with the first worm wheel 1151. The first worm gear 1142 of the first gear set 114 is used for driving the first worm wheel 1151 of the second gear set 115, and the second wheel 1152 of the second gear set 115 is used for driving the first rack 1134.

When the first motor set 116 is activated, the gear 1161 of the first motor set 116 drives the engaged first gear 114 and the first worm gear 1142 co-axial with the first gear 114 to rotate. The first worm gear 1142 in turn drives the first worm wheel 1151 to rotate so that the second gear 1152 co-axial with the first worm wheel 1151 also rotates. Thereafter, the second gear 1152 drives the first rack 1134 engaged therewith to move up or down so that the whole first sliding plate 113 moves up or down along the Y-axis to adjust the position of the lens 200 in the Y-axis.

To make the first sliding plate 113 slide smoothly and steadily up and down along the Y-axis without tilting, a fifth gear 117 is selectively disposed near the second fixing rod 112. Furthermore, a third rack 1135 is disposed on the first sliding plate 113 in a location correspond to the fifth gear 117. Therefore, through the combination of gear and rack disposed on the first side and the second side (the left side and the right side) of the first sliding plate 113, the first sliding plate 113 moves up and down steadily along the Y-axis without tilting.

Figure 3A:
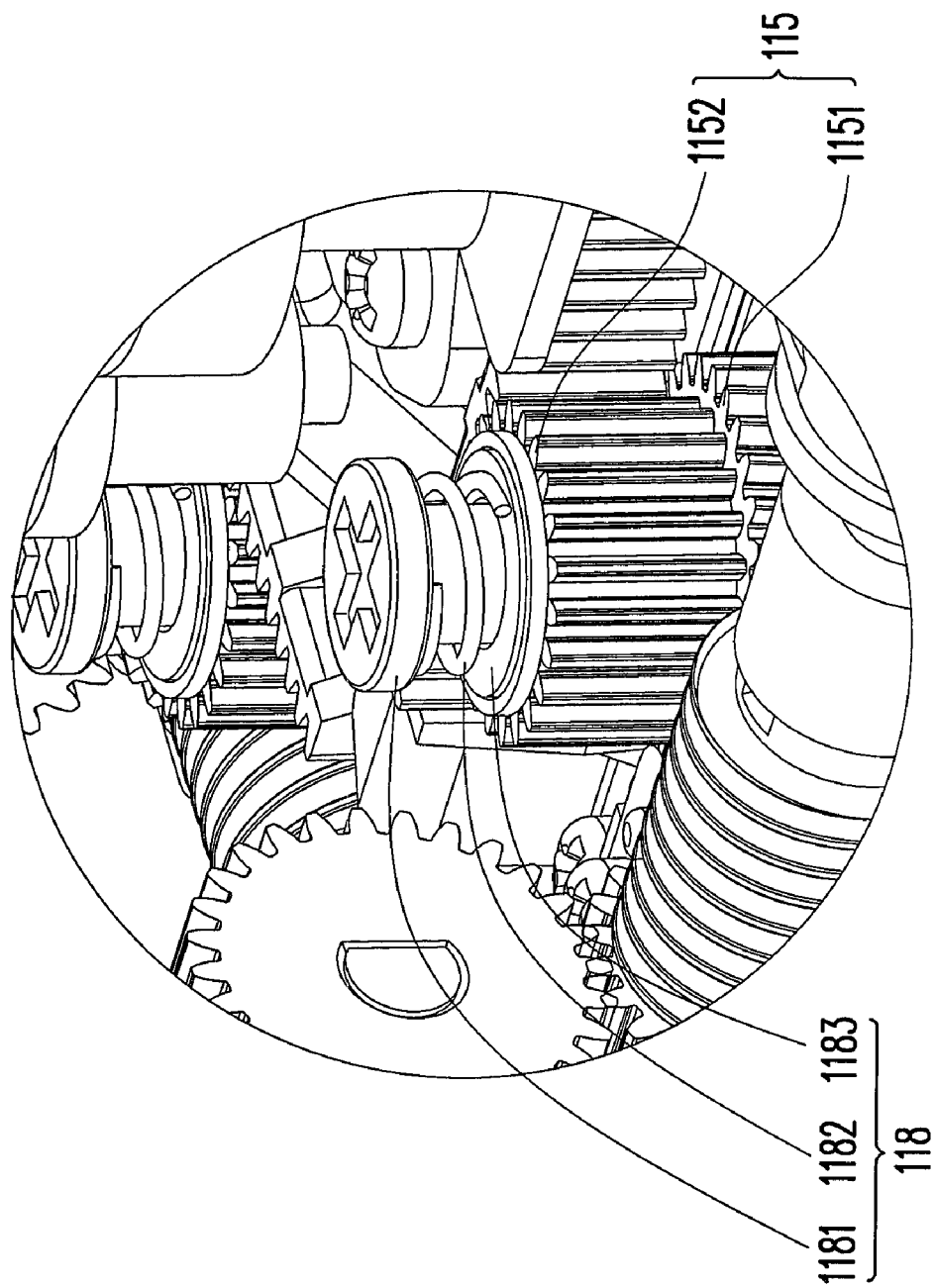
FIG. 3A is a diagram showing a perspective view of a self-locking mechanism according to an embodiment of the invention.
Figure 3B:
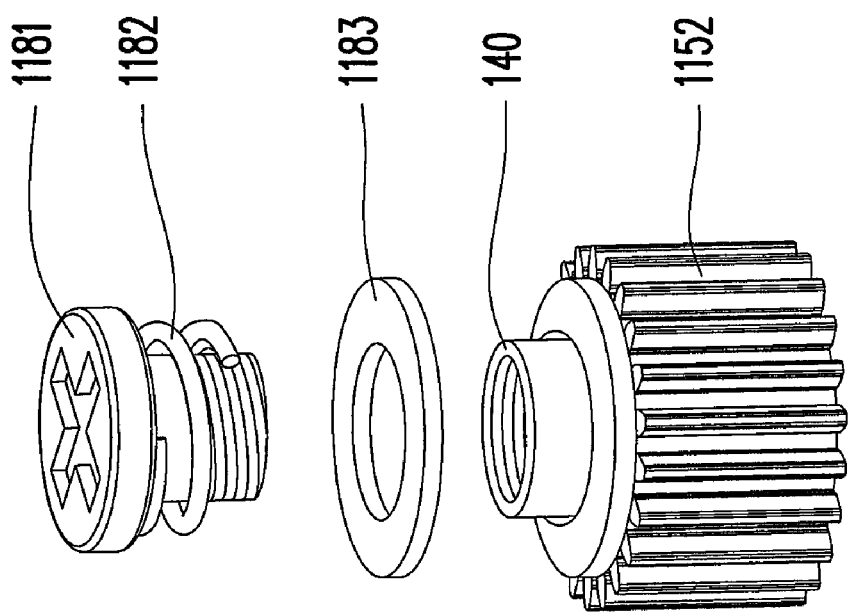
FIG. 3B is a diagram showing an exploded view of the self-locking mechanism of FIG. 3A.

Additionally, to prevent the gaps between the first worm gear 1142 and the first worm wheel 1151 and between the second gear 1152 and the first rack 1134 due to design or the assembling process from providing a relatively loose mesh and subsequently causing the first sliding plate 113 to swing when being transported or moved from one place to another, a self-locking mechanism 118 is specially disposed on the second gear set 115 in the embodiment of the present invention so that the first sliding plate 113 is prevented from swinging or shifting in the process of transporting the lens-shifting device around. FIG. 3A is a diagram showing a perspective view of a self-locking mechanism according to an embodiment of the present invention. FIG. 3B is a diagram showing an exploded view of the self-locking mechanism of FIG. 3A. As shown in FIGS. 3A and 3B, the lens-shifting device 100 further includes a first rod element 140 fixed on the base 130 perpendicularly with the second gear set 115 slid into the first rod element 140. The self-locking mechanism 118 is disposed on the first rod element 140. The self-locking mechanism 118 includes a screw 1181, a spring 1182 and a pad 1183. The screw 1181 is screwed on one end of the first rod element 140. The screw 1181 passes through the spring 1182 and the pad 1183. The spring 1182 presses against the pad 1183 and the pad presses against the second gear 1152. Since damping is produced as a result of friction, the second gear 1152 is prevented from rotating or swinging in the static state. Therefore, swinging or shifting of the lens 200 when the projector is transported or moved from one place to another is prevented. Similarly, a self-locking mechanism may be disposed on the fifth gear 117 to prevent the first sliding plate 113 from sliding or shifting.

Figure 4B:
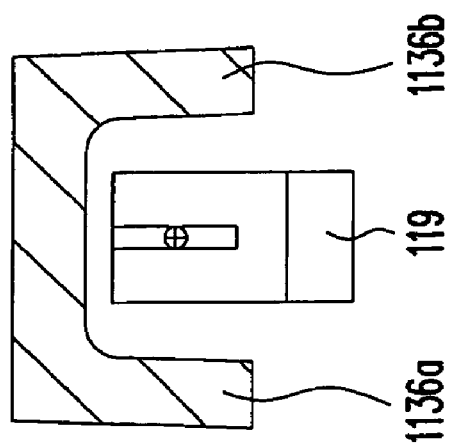
FIG. 4B is a diagram showing a side view of the light sensor and the light-blocking lead of FIG. 4A.
Figure 4A:
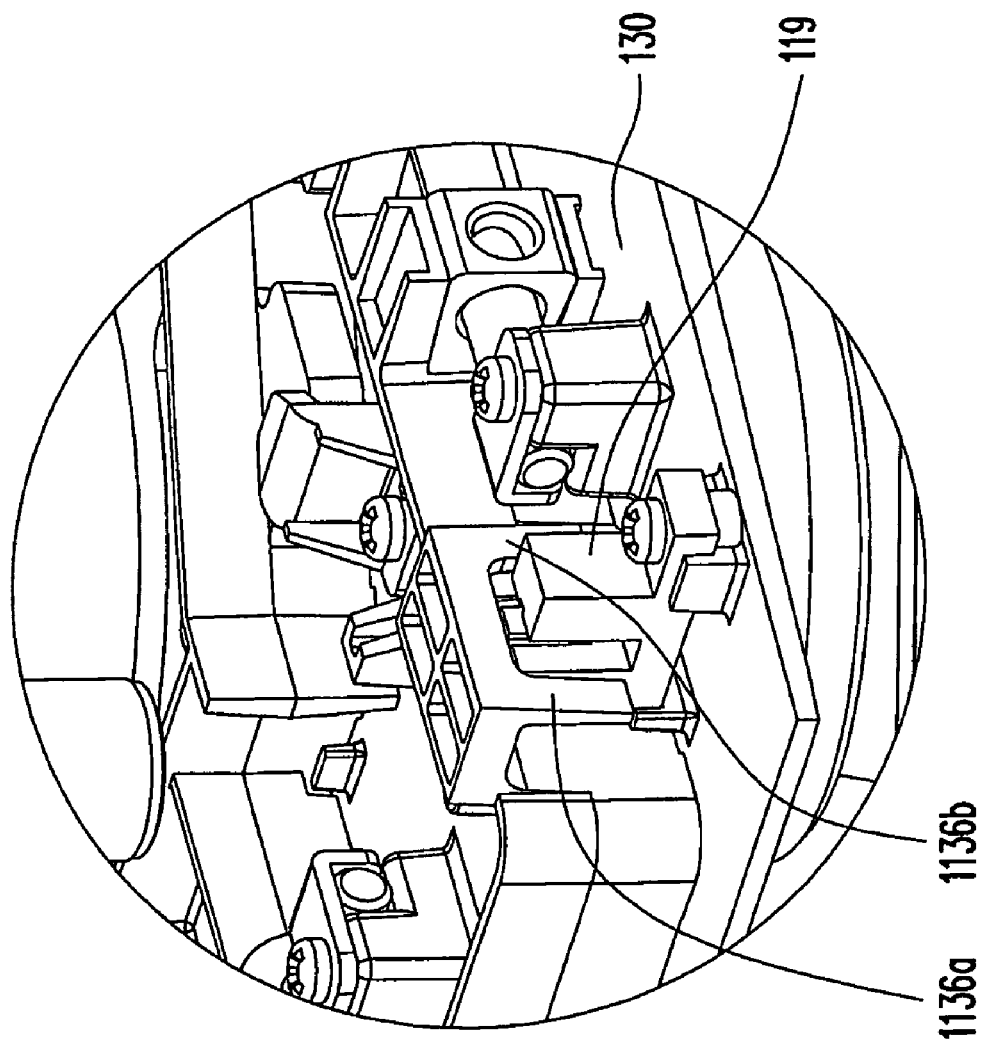
FIG. 4A is a diagram showing a perspective view of a light sensor and a light-blocking lead disposed on the lens-shifting device.

Furthermore, to prevent the first motor set 116 from continuously driving the first sliding plate 113 forward and damage the transmission gear after the first sliding plate 113 has moved to a limit point of the design, a light sensor is disposed in the present embodiment to limit the movement of the first sliding plate 113 within the effective imaging area of the lens 200. FIG. 4A is a diagram showing a perspective view of the light sensor and the light-blocking leads disposed on the lens-shifting device. FIG. 4B is a diagram showing a side view of the light sensor and the light-blocking leads of FIG. 4A. As shown in FIGS. 4A and 4B, a first light sensor 119 is disposed on the base 130 in the embodiment of the present invention. Moreover, two first light-blocking leads 1136a and 1136b are disposed on the second side of the sliding plate 113 corresponding to the light sensor 119, and a distance between the light-blocking lead 1136a and the light-blocking lead 1136b is the effective imaging area of the lens 200. Furthermore, the projection of the first light sensor 119 is located between the light-blocking lead 1136a and the light-blocking lead 1136b. When the first sliding plate 113 moves along the Y-axis and one of the light-blocking leads 1136a or 1136b passes by the first light sensor 119, the light sensor 119 transmits a signal to the first motor set 116 to stop driving the first gear set 114. Consequently, damage to the transmission gear is prevented. In the present embodiment, the first light sensor 119 is a light blocking device. However, the user may use other types of sensors and the present invention is not intended limit their use.

As shown in FIGS. 2A and 2B, the first axial direction adjusting mechanism 110 is used for adjusting the position of the lens 200 in the Y-axis, and the second axial direction adjusting mechanism 120 is used for adjusting the position of the lens 200 in the X-axis. The components of the second axial direction adjusting mechanism 120 and the connecting relationships between the components are almost identical to those of the first axial direction adjusting mechanism 110. The main difference is that the two groups of adjusting mechanisms are disposed in a direction perpendicular to each other and are used respectively for adjusting position of the lens 200 on the X-axis and the Y-axis.

The second axial adjusting mechanism 120 is disposed on the sliding plate 113 and includes a third fixing rod 121 and a fourth fixing rod 122, a second sliding plate 123, a third gear set 124 and a fourth gear set 125. The third fixing rod 121 and the fourth fixing rod 122 are respectively fixed on a third side and a fourth side of the first sliding plate 113. Furthermore, the third fixing rod 121 and the fourth fixing rod 122 are in parallel. The second sliding plate 123 is slidably mounted on the third fixing rod 121 and the fourth fixing rod 122 along the second axial direction (the X-axis). The lens 200 is disposed on the second sliding plate 123. One side of the second sliding plate 123 has a second rack 1231. The third gear set 124 has a third gear 1241 and a second worm gear 1242 co-axial with the third gear 1241. The third fixing rod 121 passes through the third gear set 124 such that the third gear 1241 and the second worm gear 1242 may rotate relative to the third fixing rod 121. The fourth gear set 125 is disposed between the third fixing rod 121 and the second rack 1231. The fourth gear set 125 has a second worm wheel 1251 and a fourth gear 1252 coaxial with the second worm wheel 1251. The second worm gear 1242 is used to drive the second worm wheel 1251 and the fourth gear 1252 is used to drive the second rack 1231 such that the second sliding plate 123 is movable relative to the third fixing rod 121 and the fourth fixing rod 122 in the X-axis direction. Since the manner in which the second axial adjusting mechanism 120 moves is identical to the manner in which the first axial adjusting mechanism 110 move, a detailed description is omitted.

Similarly, the lens-shifting device 100 uses a second motor set 126 to drive the third gear 1241 to rotate. In addition, a sixth gear 127 is disposed on the second sliding plate 123 near the fourth fixing rod 122, and a fourth rack 1232 engaged to the sixth gear 127 is disposed on the second sliding plate 123 at a corresponding location. Through the combination of gears and the racks respectively disposed at the top and bottom side of the second sliding plate 123, the second sliding plate 123 steadily moves to the left or the right in the X-axis direction without any tilting. Moreover, the aforementioned self-locking mechanism 118 (as shown in FIGS. 4A and 4B) is selectively disposed on the third gear set 125 and the sixth gear 127 to prevent the second sliding plate 123 from sliding or shifting when being transported or moved from one place to another. Since the components of the self-locking mechanism and the connecting relationships between the components are identical to the foregoing self-locking mechanism 118, a detailed description is not repeated.

In summary, the lens-shifting device according to the embodiment of the present invention at least includes one, part of or all of the following advantages:

1. The lens-shifting device in the embodiment of the present invention has a gear set disposed between the worm gear slid on the fixing rod and the rack on the sliding plate. Through the tight mesh between the gear set and the worm gear and between the gear set and the rack, the position of the lens on the X-axis or the Y-axis is accurately adjusted.

2. Gear sets are disposed on the right and the left side as well as the top and the bottom side of the sliding plate in the embodiment of the present invention. Through the combination of the gear sets and the racks on the sliding plate, the sliding plate steadily moves along the X-axis or the Y-axis without tilting.

3. A self-locking mechanism is disposed on the gear set of the lens-shifting device. The self-locking mechanism uses friction to generate damping so that the gear is prevented from rotating or swinging in a static state. As a result, the lens is prevented from swinging or shifting when the projector is being transported or moved from one plate to another.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens-shifting device for a projector having a lens, the lens-shifting device comprising:
   a base;
   a first fixing rod, fixed on one side of the base;
   a second fixing rod, fixed on another side of the base;
   a sliding plate, slidably mounted on the first fixing rod and the second fixing rod, wherein the lens is fixed on the sliding plate, and one side of the sliding plate has a rack;
   a first gear set, having a first gear and a worm gear co-axial with the first gear, wherein the first fixing rod passes through the first gear set such that the first gear and the worm gear are able to rotate relative to the first fixing rod; and
   a second gear set, having a worm wheel and a second gear co-axial with the worm wheel and disposed between the first fixing rod and the rack, wherein the worm gear is used for driving the worm wheel and the second gear is used for driving the rack such that the sliding plate is able to move relative to the first fixing rod and the second fixing rod.

2. The lens-shifting device according to claim 1, further comprising:
   a motor set for driving the first gear set;
   a light sensor, disposed on the base; and
   two light-blocking leads, connected to the sliding plate and corresponding to the light sensor, wherein a distance between the two light-blocking leads is an effective imaging area of the lens of the projector, and when one of the light-blocking leads passes by the light sensor, the light sensor transmits a signal to the motor set so as to stop driving the first gear set.

3. The lens-shifting device according to claim 1, further comprising a first rod element fixed on the base perpendicularly, wherein the first rod element passes through the second gear set, and the second gear set is able to rotate relative to the first rod element.

4. The lens-shifting device according to claim 3, further comprising a self-locking mechanism disposed on the first rod element, wherein the self-locking mechanism comprises a screw, a spring and a pad, the screw is screwed on one end of the firs rod element, and the screw passes through the spring and the pad such that the spring presses against the pad and the pad presses against the second gear.

5. The lens-shifting device according to claim 1, further comprising a third gear near the second fixing rod, and the sliding plate further comprising a rack engaged with the third gear, wherein the second gear and the third gear are used for controlling a sliding direction of sliding plate.

6. The lens-shifting device according to claim 5, further comprising a second rod element fixed on the base perpendicularly, wherein the second rod element passes through the third gear, and the third gear is able to rotate relative to the second rod element.

7. The lens-shifting device according to claim 6, further comprising a self-locking mechanism disposed on the second rod element, wherein the self-locking mechanism comprises a screw, a spring and a pad, the screw is screwed on one end of the second rod element, and the screw passes through the spring and the pad such that the spring presses against the pad and the pad presses against the third gear.

8. A lens-shifting device for a projector having a lens, the lens-shifting device comprising:
  a base;
  a first axial direction adjusting mechanism, disposed on the base, the first axial direction adjusting mechanism comprising:
    a first fixing rod, fixed on a first side of the base;
    a second fixing rod, fixed on a second side of the base;
    a first sliding plate, slidably mounted on the first fixing rod and the second fixing rod for moving in a first axial direction, wherein a first side of the first sliding plate has a first rack;
    a first gear set, having a first gear and a first worm gear co-axial with the first gear, wherein the first fixing rod passes through the first gear set, such that the first gear and the first worm gear are able to rotate relative to the first fixing rod; and
    a second gear set, having a first worm wheel and a second gear co-axial with the first worm wheel and disposed between the first fixing rod and the first rack, wherein the first worm gear is used for driving the first worm wheel and the second gear is used for driving the first rack such that the first sliding plate is able to move relative to the first fixing rod and the second fixing rod along the first axial direction; and
  a second axial direction adjusting mechanism, disposed on the first sliding plate, the second axial direction adjusting mechanism comprising:
    a third fixing rod, fixed on a third side of the first sliding plate;
    a fourth fixing rod, fixed on a fourth side of the first sliding plate;
    a second sliding plate, slidably mounted on the third fixing rod and the fourth fixing rod for moving in a second axial direction, wherein the lens is disposed on the second sliding plate and one side of the second sliding plate has a second rack, and the second axial direction is substantially perpendicular to the first axial direction;
    a third gear set having a third gear and a second worm gear co-axial with the third gear, wherein the third fixing rod passes through the third gear such that the third gear and the second worm gear are able to rotate relative to the third fixing rod; and
    a fourth gear set, having a second worm wheel and a fourth gear co-axial with the second worm wheel and disposed between the third fixing rod and the second rack, wherein the second worm gear is used for driving the second worm wheel and the fourth gear is used for driving the second rack such that the second sliding plate is able to move relative to the third fixing rod and the fourth fixing rod along the second axial direction.

9. The lens-shifting device according to claim 8, further comprising:
  a first motor set for driving the first gear set;
  a first light sensor, disposed on the base; and
  two first light-blocking leads, connected to the first sliding plate and corresponding to the first light sensor, wherein a distance between the two first light-blocking leads is an effective imaging area of the lens of the projector, and when one of the first light-blocking leads passes by the first light sensor, the light sensor transmits a signal to the first motor set to stop driving the first gear set.

10. The lens-shifting device according to claim 8, further comprising a first rod element fixed on the base perpendicularly, wherein the first rod element passes through the second gear set, and the second gear set is able to rotate relative to the first rod element.

11. The lens-shifting device according to claim 10, further comprising a self-locking mechanism disposed on the first rod element, wherein the self-locking mechanism comprises a screw, a spring and a pad, the screw is screwed on one end of the first rod element, and the screw passes through the spring and the pad such that the spring presses against the pad and the pad presses against the second gear.

12. The lens-shifting device according to claim 8, further comprising a fifth gear near the second fixing rod, and the first sliding plate further comprises a third rack engaged with the fifth gear, wherein the second gear and the fifth gear are used to control a sliding direction of the first sliding plate.

13. The lens-shifting device according to claim 12, further comprising a second rod element fixed on the base perpendicularly, wherein the second rod element passes through the fifth gear, and the fifth gear is able to rotate relative to the second rod element.

14. The lens-shifting device according to claim 13, further comprising a self-locking mechanism disposed on the second rod element, wherein the self-locking mechanism comprises a screw, a spring and a pad, the screw is screwed on one end of the second rod element, and the screw passes through the spring and the pad such that the spring presses against the pad and the pad presses against the fifth gear.

15. The lens-shifting device according to claim 14, further comprising:
  a second motor set for driving the third gear set;
  a second light sensor, disposed on the first sliding plate; and
  two second light-blocking leads, connected to the second sliding plate and corresponding to the second light sensor, wherein a distance between the two light-blocking leads is an effective imaging area of the lens of the projector, and when one of the second light-blocking leads passes by the second light sensor, the second light sensor transmits a signal to the second motor set to stop driving the third gear set.

16. The lens-shifting device according to claim 8, further comprising a third rod element fixed on the first sliding plate perpendicularly, wherein the third rod element passes through the fourth gear set, and the fourth gear set is able to rotate relative to the third rod element.

17. The lens-shifting device according to claim 16, further comprising a self-locking mechanism disposed on the third rod element, wherein the self-locking mechanism comprises a screw, a spring and a pad, the screw is screwed on one end of the third rod element, and the screw passes through the spring and the pad such that the spring presses against the pad and the pad presses against the fourth gear.

18. The lens-shifting device according to claim 8, further comprising a sixth gear near the fourth fixing rod and the second sliding plate further comprises a fourth rack engaged with the sixth gear, wherein the fourth gear and the sixth gear are used to control a sliding direction of the second sliding plate.

19. The lens-shifting device according to claim 18, further comprising a fourth rod element fixed on the first sliding plate perpendicularly, wherein the fourth rod element passes through the sixth gear, and the sixth gear is able to rotate relative to the fourth rod element.

20. The lens-shifting device according to claim 19, further comprising a self-locking mechanism disposed on the fourth rod element, wherein the self-locking mechanism comprises a screw, a spring and a pad, the screw is screwed on one end of the fourth rod element, and the screw passes through the spring and the pad such that the spring presses against the pad and the pad presses against the sixth gear.

* * * * *